United States Patent
Geissdörfer et al.

(10) Patent No.: US 6,982,536 B2
(45) Date of Patent: Jan. 3, 2006

(54) DEVICE AND METHOD FOR APPORTIONING A MOVEMENT OF A MACHINE ELEMENT ALONG A DRIVE AXIS OF A MACHINE TOOL OR PRODUCTION MACHINE

(75) Inventors: Klaus Geissdörfer, Erlangen (DE); Carsten Hamm, Erlangen (DE); Wolfgang Papiernik, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/999,197

(22) Filed: Nov. 29, 2004

(65) Prior Publication Data

US 2005/0116676 A1 Jun. 2, 2005

(30) Foreign Application Priority Data

Nov. 28, 2003 (DE) ................................ 103 55 614

(51) Int. Cl.
    *G05B 19/25* (2006.01)
(52) U.S. Cl. ...................... 318/632; 318/609; 318/610; 318/630; 318/575
(58) Field of Classification Search ................ 318/575, 318/609, 610, 630, 632, 801; 701/41; 708/819
    See application file for complete search history.

(56) References Cited

U.S. PATENT DOCUMENTS

| | | | | |
|---|---|---|---|---|
| 5,210,712 A | * | 5/1993 | Saito ........................... | 708/819 |
| 5,473,539 A | * | 12/1995 | Shimizu et al. ................ | 701/41 |
| 5,528,119 A | * | 6/1996 | Rundqwist et al. .......... | 318/632 |
| 2002/0063016 A1 | * | 5/2002 | Kada .......................... | 180/446 |
| 2003/0039054 A1 | * | 2/2003 | Pasolini et al. ................ | 360/75 |
| 2004/0183494 A1 | * | 9/2004 | Nagaoka et al. ............. | 318/632 |
| 2005/0029982 A1 | * | 2/2005 | Stancu et al. ................ | 318/801 |

* cited by examiner

Primary Examiner—Paul Ip
(74) Attorney, Agent, or Firm—Henry M. Feiereisen

(57) ABSTRACT

A device and method for apportioning a movement of a machine element driven by at least two drives for movement along a drive axis of a machine tool or production machine are described. A low-pass filter filters predetermined desired drive axis values to generate filtered desired drive axis values, with a first controller receiving the filtered desired drive axis values as control input value for controlling a first of the at least two drives. A delay unit with a constant group delay time temporally delays the desired drive axis values and generates delayed desired drive axis values, whereafter a subtracter determines a difference between the filtered desired drive axis values and the delayed desired drive axis values. A second controller receives the determined difference and provides, based on the determined difference, a second control input value for controlling a second of the at least two drives. With these features according to the invention, a movement of a machine element along a drive axis of a machine tool or production machine can be optimally apportioned between two or more drives.

7 Claims, 7 Drawing Sheets

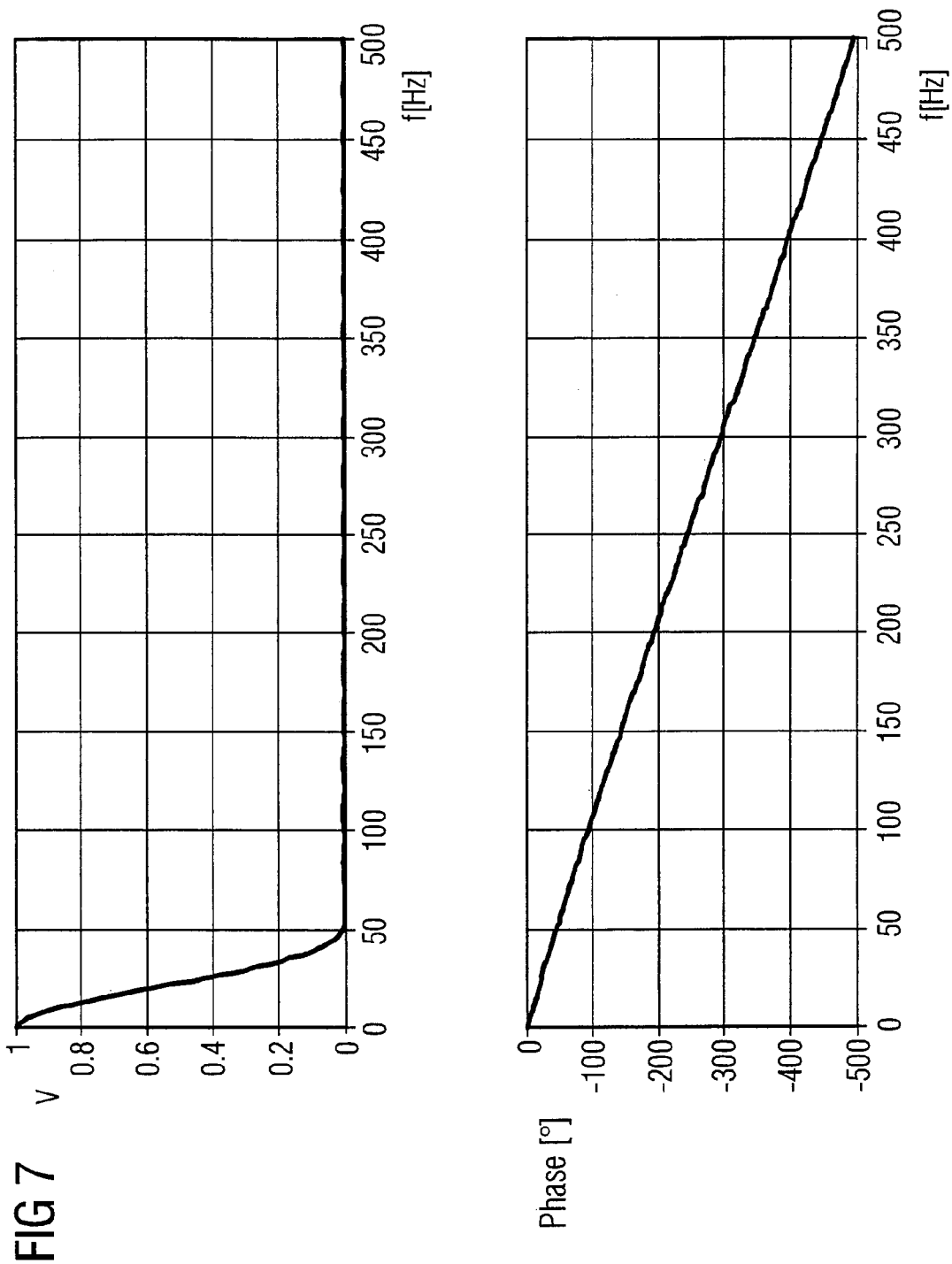

DEVICE AND METHOD FOR APPORTIONING A MOVEMENT OF A MACHINE ELEMENT ALONG A DRIVE AXIS OF A MACHINE TOOL OR PRODUCTION MACHINE

CROSS-REFERENCES TO RELATED APPLICATIONS

This application claims the priority of German Patent Application, Serial No. 103 55 614.1, filed Nov. 28, 2003, pursuant to 35 U.S.C. 119(a)–(d).

BACKGROUND OF THE INVENTION

The present invention relates to a device and a method for apportioning a movement of a machine element, in particular of a machine element that can be moved by two or more drives along a drive axis of a machine tool or production machine.

Nothing in the following discussion of the state of the art is to be construed as an admission of prior art.

Conventional machine tools and production machines are frequently equipped with a so-called redundant kinematic drives, which use at least two separate drives to move a machine element, for example a tool clamping device of the machine or a tool, along a drive axis.

FIG. 1 shows schematically a machine element driven along a single drive axis X to illustrate the principle of a redundant kinematic drive. As seen in FIG. 1, a first drive has two linear motors 3 and 4 that can guide a beam 5 along two vertical support columns 1 and 2 oriented parallel to the drive axis X. A second support column 6 is secured to the beam 5 and guides a second drive, for example a linear motor 7, which also moves parallel to the drive axis X. The movement directions of the individual drives 3, 4, 7 are indicated by arrows. Machine elements, which in the depicted embodiments are represented by a machine clamping device 8 and a tool 9, are attached to the drive 7. It will be understood that the machine of FIG. 1 can include additional drive axes, which are not essential for an understanding of the invention and have been omitted from FIG. 1 for sake of clarity.

If the tool 9 is to be moved along the drive axis X to a predetermined desired position value, then a decision has to be made how to apportion the required movement among the drives 3, 4, and 7. The first drive 3, 4 has to move a large mass due to the size of the linear motors 3 and 4 and is therefore unable to move fast, whereas the second drive 7 needs to move only small masses (i.e., the machine clamping device 8 and the tool 9) and can therefore move dynamically along the drive axis X. Accordingly, a dynamic, i.e., a high-frequency, movement of the machine element should be executed by the second drive system 7, whereas a less dynamic, i.e., a low-frequency movement should be performed by the first drive 3, 4. It will be understood that other types of direct drives or indirect drives can also be used instead of the linear motors 3, 4 depicted in FIG. 1.

FIG. 2 shows a conventional control system for apportioning the movement of a machine port along a drive axis of a machine tool or production machine. A controller 23 of the machine includes a computer 10 that computes a number of desired drive axis values $x_{soll}$ for controlling the movement of the machine element. The desired drive axis values $x_{soll}$ can be determined from operating parameters set by an operator. It will be understood that the controller 23 can include other functions and procedures, which are not important for an understanding of the invention and have been omitted from FIG. 2 for the sake of clarity.

The so determined desired drive axis values $x_{soll}$ are then divided into a low-frequency component and a high frequency component, whereby the low-frequency component is determined by filtering the desired drive axis values $x_{soll}$ with a low-pass filter 11, generating filtered desired drive axis values $x_{sollg}$ at the output of the low-pass filter 11, which describe the low-frequency component of the movement. The high-frequency component of the tool movement is then determined by subtracting the filtered desired drive axis values $x_{sollg}$ from the desired drive axis values $x_{soll}$ with a subtracter 18, generating a difference value $x_{soll\Delta}$ at the output of the subtracter 18. The filtered desired drive axis values $x_{sollg}$ are supplied as control input variables to a first controller 19, which generates output signals for controlling a converter 24 that supplies power to a first drive 21 representing the linear motors 3 and 4 shown in FIG. 1. The first drive 21 generates actual drive axis values $x_{ist1}$, which are fed back to the first controller 19.

Likewise, the difference $x_{soll\Delta}$ is supplied as control input variable to a second controller 20, which controls a converter 25 that supplies power a second drive 22 representing the linear motor 7 shown in FIG. 1. The second drive 22 generates actual drive axis values $x_{ist2}$, which are fed back to the second controller 20.

The low-pass filter 11 depicted in FIG. 2 is typically implemented in modern devices that apportion a movement between drives, as, for example, a Tschebyscheff filter, a Bessel filter, a Butterworth filter, or as an elliptical filter. These conventional low-pass filters disadvantageously do not have a constant group delay time, so that the phase response does not fall or rise linearly with the frequency. FIG. 6 shows the amplification V and the non-linear phase response of an exemplary elliptical filter.

Due to the non-constant phase delay time of these filters, the filtered desired drive axis values $x_{sollg}$, unlike the desired drive axis values $x_{soll}$, have different temporal delays. In conventional control systems, where the desired drive axis values $x_{soll}$ are not delayed before being subtracted from the filtered desired drive axis values $x_{sollg}$ in the subtracter 18, the resulting difference $x_{soll\Delta}$ still has a relatively large contribution from the low-frequency component of the movement. It should be noted that delaying the desired drive axis values $x_{soll}$ before subtraction would likely not be advantageous, because the temporal delays of the desired drive axis values $x_{soll}$ in the filter can vary.

FIG. 3 shows corresponding signals for an exemplary low-frequency sinusoidal movement with a superimposed sinusoidal movement at a higher frequency. Unlike the desired drive axis values $x_{soll}$, the filtered desired drive axis values $x_{sollg}$ include only low-frequency components. The difference $x_{soll\Delta}$ includes low-frequency components of the movement in addition to the high-frequency component, which significantly increases the amplitude of the difference $x_{soll\Delta}$. Consequently, in practical applications, the travel range of the dynamically configured second drive has to be oversized, which increases its cost.

It would therefore be desirable to provide a device and a method for optimally apportioning the movement of a machine element that is driven by multiple drives along a drive axis of a machine tool or production machine.

SUMMARY OF THE INVENTION

According to one aspect of the present invention, a device for apportioning a movement of a machine element driven by at least two drives for movement along a drive axis of a machine tool or production machine includes a low-pass filter that filters predetermined desired drive axis values to generate filtered desired drive axis values, a first controller receiving the filtered desired drive axis values as control input value for controlling a first of the at least two drives, and a delay unit with a constant group delay time, wherein the delay unit temporally delays the desired drive axis values to generate delayed desired drive axis values. The device further includes a subtracter that determines a difference between the filtered desired drive axis values and the delayed desired drive axis values, and a second controller that receiving the determined difference and provides, based on the determined difference, a second control input value for controlling a second of the at least two drives.

According to another aspect of the invention, a method for apportioning a movement of a machine element driven by at least two drives for movement along a drive axis of a machine tool or production machine includes the steps of filtering predetermined desired values with a low-pass filter that has a constant group delay time, and generating filtered desired drive axis values; and furthermore transmitting the filtered desired drive axis values to a first controller as a control input value for controlling a first of the at least two drives, and temporally delaying the desired drive axis values with a delay time that is identical to the group delay time. The method further includes the steps of determining a difference between the filtered desired drive axis values and the delayed desired drive axis values, and transmitting the determined difference to a second controller as a control input value for controlling a second of the at least two drives.

Machine tools in the context of the present invention can also include, for example, uniaxial or multi-axis lathes, milling machines, as well as drilling or grinding machines. Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

By dividing the programmed movement into a low-frequency component and a high frequency component, a controller for redundant kinematic drives can be implemented in a very simple manner. In addition, significant cost savings can be achieved because the travel range of the dynamic drive does not have to be oversized.

According to an advantageous embodiment of the invention, the duration of the temporal delay of the desired drive axis values $x_{soll}$ can be identical to the group delay time τ, which effectively suppresses the low-frequency components of the tool movement.

According to another advantageous embodiment of the invention, the low-pass filter can be a finite impulse response filter, because the filter coefficients of such filter can be readily determined using conventional filter computation programs.

According to yet another advantageous embodiment of the invention, the device can be an integral component of a controller of the machine tool or production machine, because most conventional machine tools or production machines already include controllers, in particular numerical controllers. Advantageously, the device of the invention can be integrated in the controller in the form of software, which obviates the need to install additional hardware.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7 shows the frequency response and phase response of a finite element filter according to the invention.

DETAILED DESCRIPTION OF PREFERRED EMBODIMENTS

Figure 1:
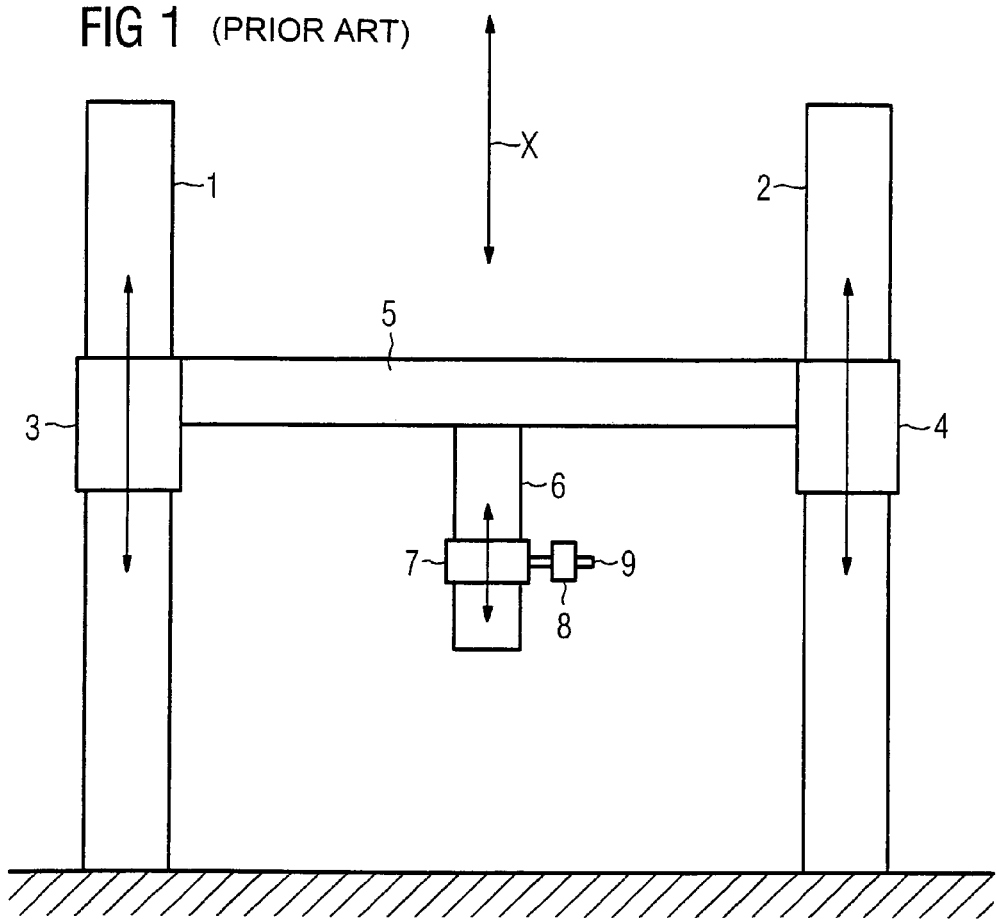
FIG. 1 shows a conventional machine tool or production machine.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
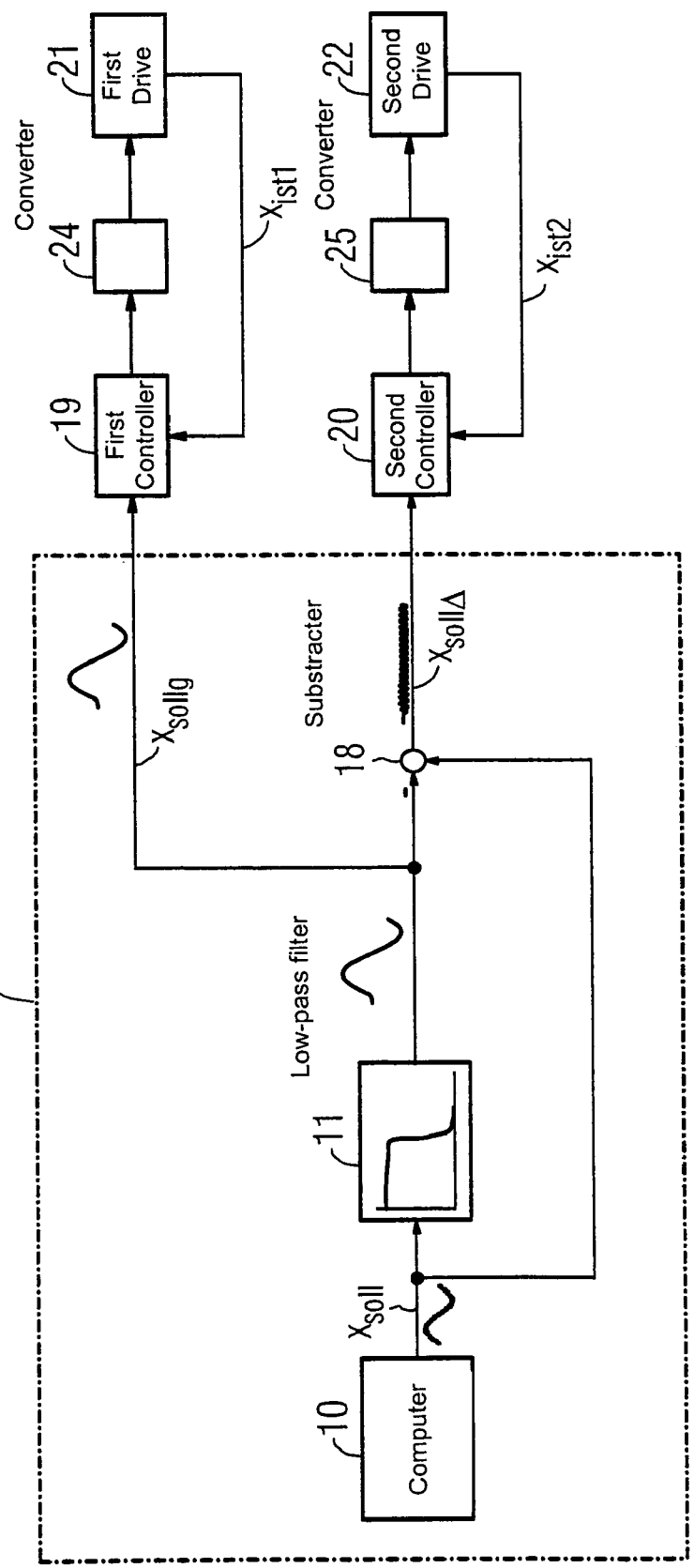
FIG. 2 shows a prior art device for apportioning a movement of a machine element.
Figure 4:
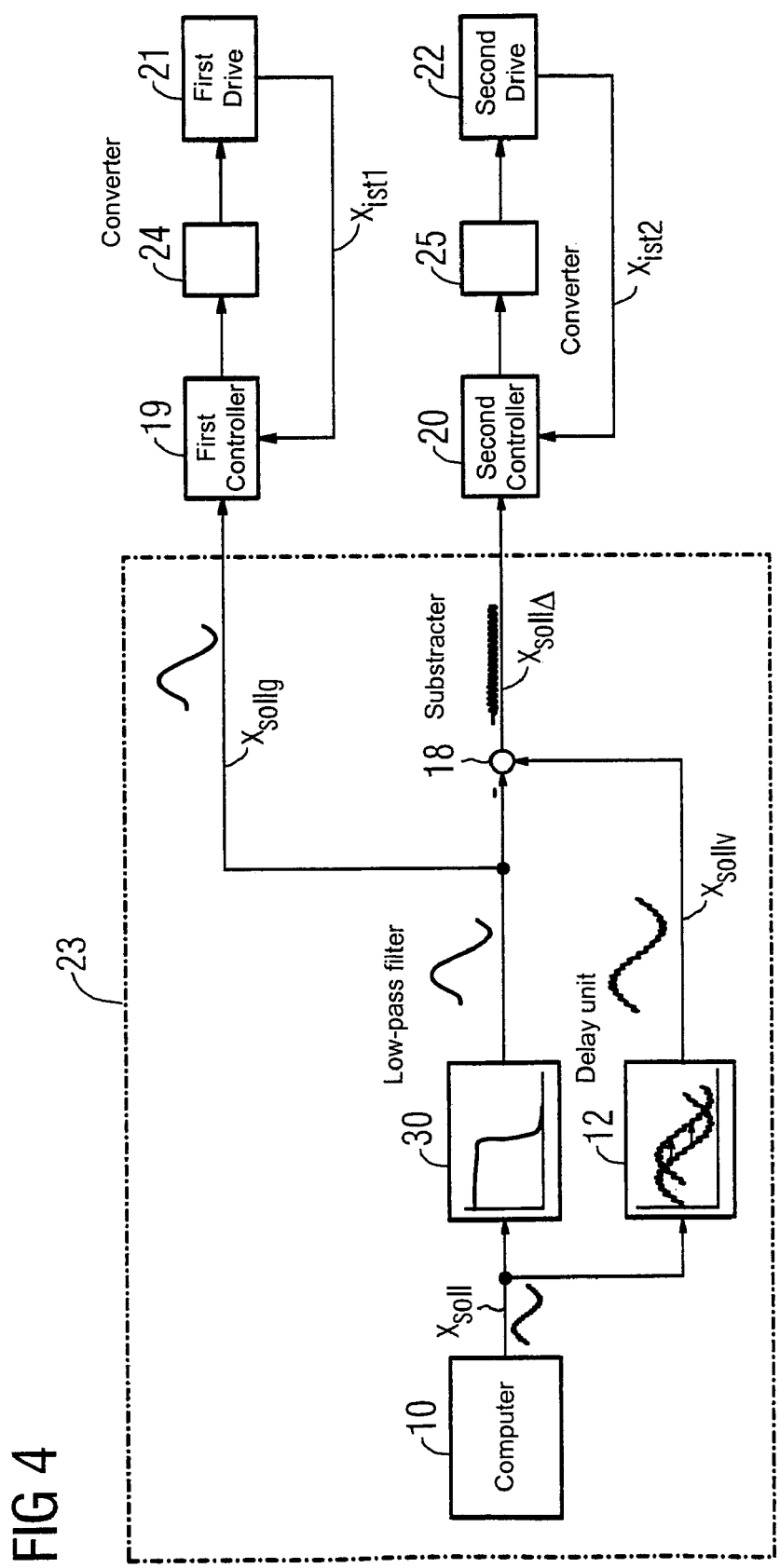
FIG. 4 shows a device for apportioning a movement of a machine element according to the invention.

Turning now to the drawing, and in particular to FIG. 4, there is shown in form of a schematic block diagram an exemplary embodiments of a device according to the invention for apportioning a movement of a machine element along a drive axis of a machine tool or production machine. Unlike the prior art device depicted in FIG. 2 which has a conventional the low-pass filter 11, the device according to the invention includes a low-pass filter 30 with a constant group delay time and an additional time delay unit 12. In all other aspects, the components depicted in FIG. 4 are identical to the components of FIG. 2 and operate in the same manner, so that for a detailed description of these components, reference is made to the description of FIG. 2.

The group delay time for the low-pass filter 30 is:

$$\tau(\omega) = \frac{d\varphi}{d\omega} = \text{constant} \tag{1}$$

wherein
φ: phase,
ω: angular frequency (ω=2π*f),
f: frequency.

A low-pass filter with a constant group delay time can be implemented, for example, as a so-called Finite Impulse Response Filter. The desired drive axis values $x_{soll}$ are filtered by a Finite Impulse Response Filter according to the following relationship:

$$x_{sollg}(n) = a_1 \cdot x_{soll}(n) + a_2 \cdot x_{soll}(n-1) + a_3 \cdot x_{soll}(n-2) \ldots + a_N \cdot x_{soll}(n-N) \quad (2)$$

wherein
n: index of the sample value,
N: order of the filter,
$a_1 \ldots a_N$: filter coefficients.

The frequency response is determined by the order N of the filter and by the coefficients $a_1 \ldots a_N$. A Finite Impulse Response Filter of this type has a constant group delay time of $$\tau(\omega) = \frac{N \cdot T}{2} \quad (3)$$

over the entire frequency range, wherein T is the sampling time for the discrete desired drive axis values $x_{soll}$. Each frequency experiences the same delay time in the filter of the invention, which is important for the present invention since machine element movements typically include a mix of frequencies.

The high-frequency component of the movement is determined according to the invention by delaying the desired drive axis values $x_{soll}$ with a delay unit 12, thereby generating at the output of the delay unit 12 delayed desired drive axis values $x_{sollv}$. The filtered delayed desired drive axis values $x_{sollg}$ are subsequently subtracted from the delayed desired drive axis values $x_{sollv}$ in a subtracter 18, which supplies at its output a difference signal $x_{soll\Delta}$ representing the high-frequency component of the movement of the machine element.

The delay unit 12, which has a delay time that is identical to or approximately equal to the group the day time τ, provides a temporal, frequency-independent match between the delayed desired drive axis values $x_{sollv}$ and the filtered delayed desired drive axis values $x_{sollg}$.

FIG. 7 shows the magnitude of the frequency response V and the phase response of an exemplary discrete Finite Impulse Response Filter with a filter order of N=40 and the following filter coefficients:

$a_1 = 0.00348930500945$
$a_2 = 0.00376099295965$
$a_3 = 0.00452892751529$
$a_4 = 0.00578316044301$
$a_5 = 0.00750053605294$
$a_6 = 0.00964517847694$
$a_7 = 0.01216933655896$
$a_8 = 0.01501456554826$
$a_9 = 0.01811321493599$
$a_{10} = 0.02139018275496$
$a_{11} = 0.02476488874243$

-continued $a_{12} = 0.02815341218819$
$a_{13} = 0.03147073525612$
$a_{14} = 0.03463302923279$
$a_{15} = 0.03755991962809$
$a_{16} = 0.0401766638225$
$a_{17} = 0.04241619761799$
$a_{18} = 0.04422093935736$
$a_{19} = 0.04554438928788$
$a_{20} = 0.04635238984863$
$a_{21} = 0.04662406440566$
$a_{22} = 0.04635238984863$
$a_{23} = 0.04554438928788$
$a_{24} = 0.04422093935736$
$a_{25} = 0.04241619761799$
$a_{26} = 0.04017666638225$
$a_{27} = 0.03755991962809$
$a_{28} = 0.03463302923279$
$a_{29} = 0.03147073525612$
$a_{30} = 0.02815341218819$
$a_{31} = 0.02476488874243$
$a_{32} = 0.02139018275496$
$a_{33} = 0.01811321493599$
$a_{34} = 0.01501456554826$
$a_{35} = 0.01216933655896$
$a_{36} = 0.00964517847694$
$a_{37} = 0.00750053605294$
$a_{38} = 0.00578316044301$
$a_{39} = 0.00452892751529$
$a_{40} = 0.00376099295965$
$a_{41} = 0.00348930500945$ The filter coefficients can be easily determined from a predetermined characteristic curve of the frequency response V by using commercially available programs for filter computations, for example "MATLAB" distributed by the Company "THE MATHWORKS". The Finite Impulse Response Filter has a linearly rising or trailing phase response due to the constant group delay time τ.

Other types of filters can be used as a low-pass filter instead of a Finite Impulse Response Filter, provided this filter has a constant group delay time τ.

Figure 3:
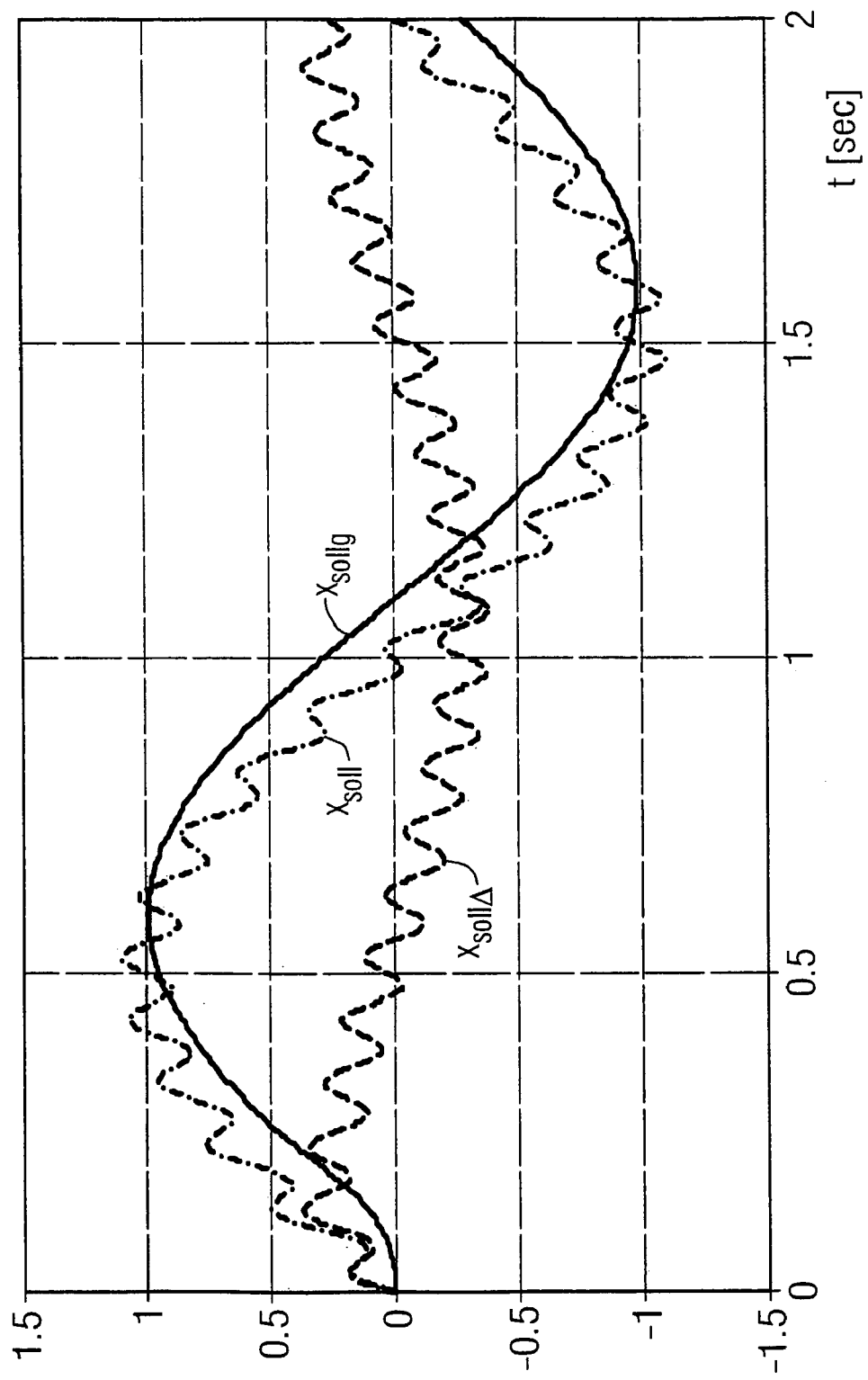
FIG. 3 shows signal curves of filtered desired drive axis values, desired drive axis values, and the difference for the prior art device of FIG. 2.
Figure 5:
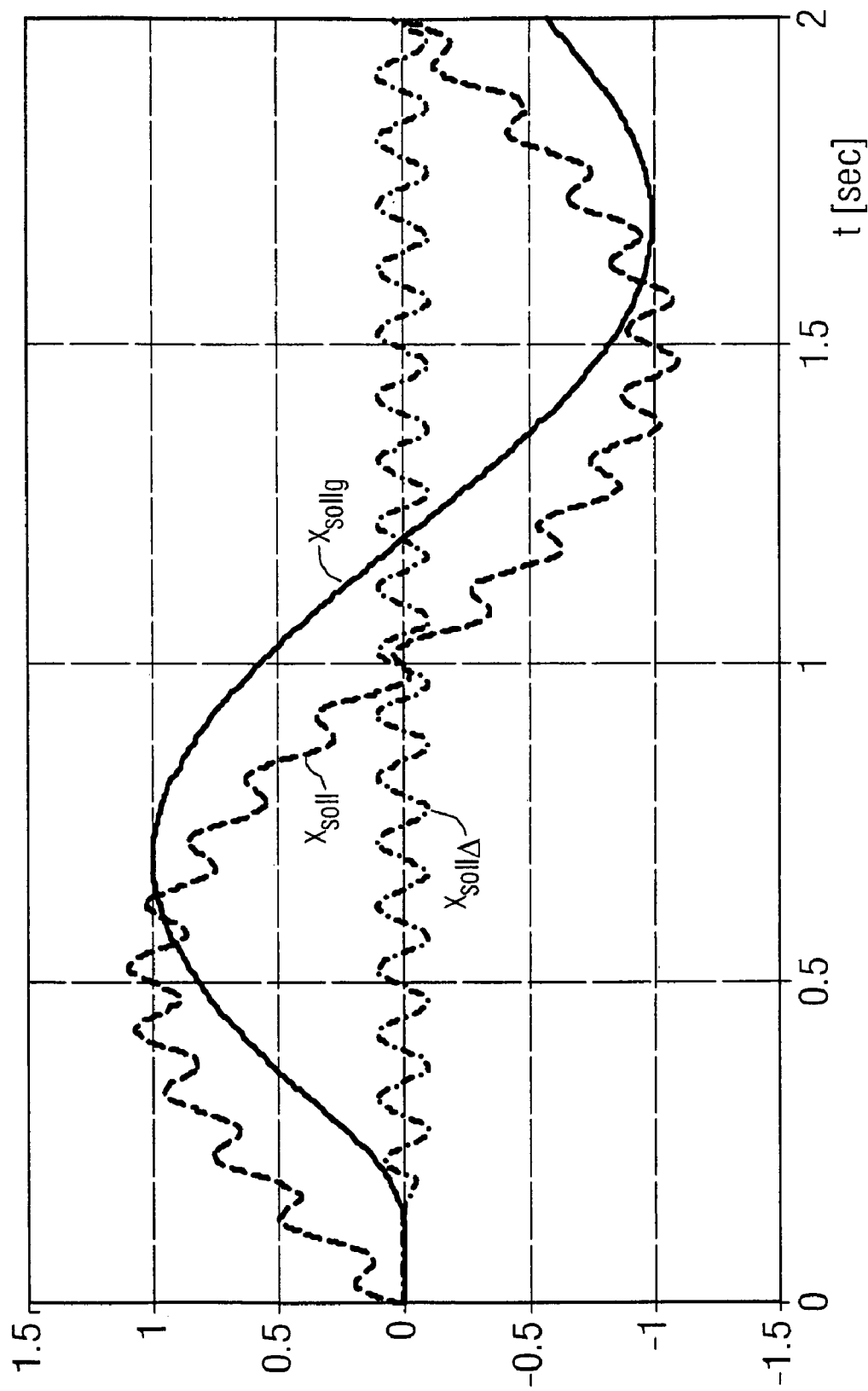
FIG. 5 shows signal curves of filtered desired drive axis values, desired drive axis values, and the difference for the device of the invention of FIG. 4.
Figure 6:
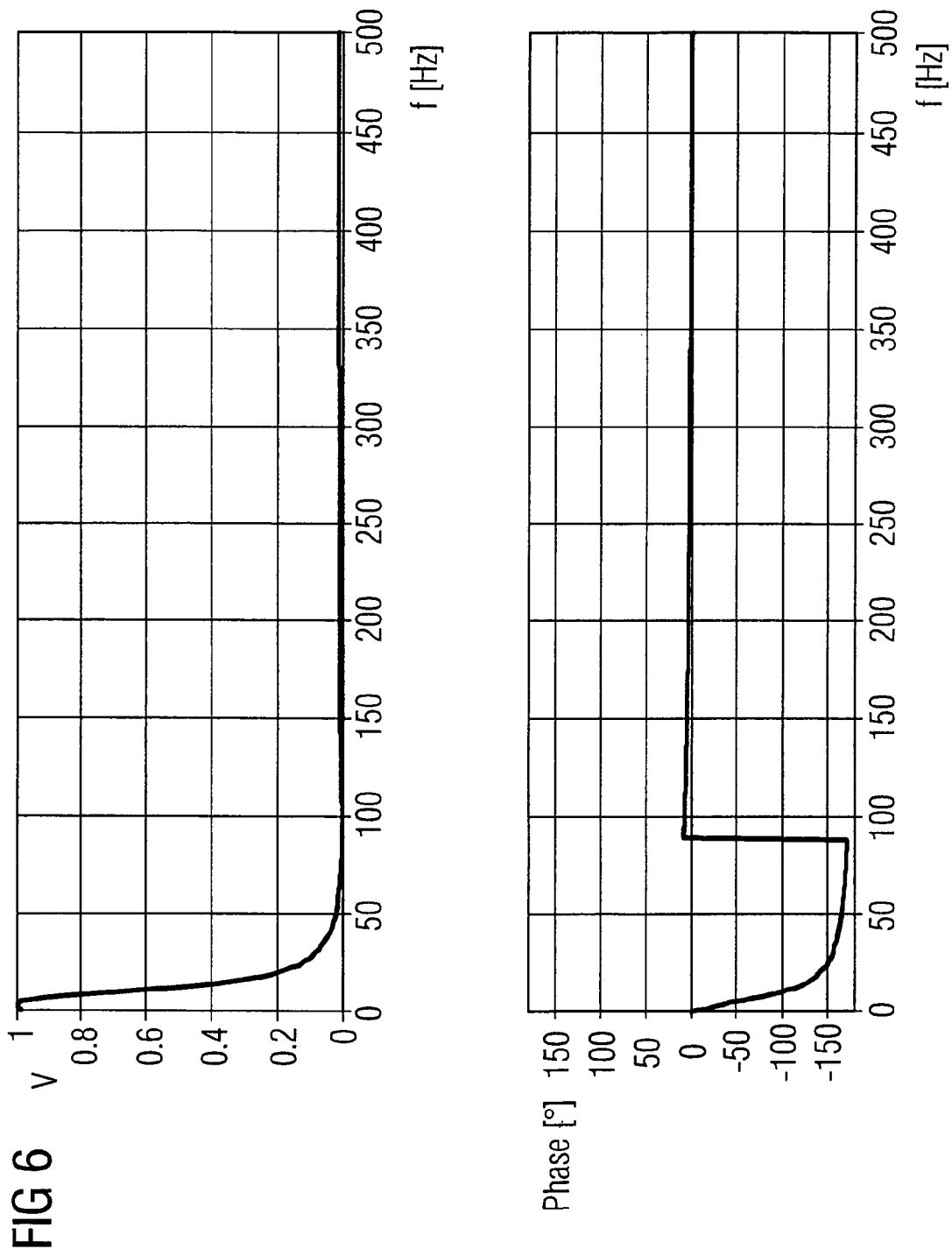
FIG. 6 shows the frequency response and phase response of an elliptical filter.

FIG. 5 shows the response of the system when the movement is apportioned according to the invention. As can be seen, the low-frequency and high-frequency components of the movement of the machine element are almost optimally divided, with the amplitude of the difference $x_{soll\Delta}$ in FIG. 5 significantly reduced in comparison to the amplitude of the difference $x_{soll\Delta}$ obtained with the prior art system of FIG. 3. The computation of FIG. 5 is based on a filter order of N=400 and a sampling time T of one millisecond.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A device for apportioning a movement of a machine element driven by at least two drives for movement along a drive axis of a machine tool or production machine, comprising:
    a low-pass filter that filters predetermined desired drive axis values to generate filtered desired drive axis values;
    a first controller receiving the filtered desired drive axis values as control input value for controlling a first of the at least two drives;
    a delay unit with a constant group delay time, said delay unit temporally delaying the desired drive axis values to generate delayed desired drive axis values;
    a subtracter that determines a difference between the filtered desired drive axis values and the delayed desired drive axis values; and
    a second controller receiving the determined difference and providing, based on the determined difference, a second control input value for controlling a second of the at least two drives.

2. The device of claim 1, wherein a duration of the temporal delay of the desired drive axis values is identical to the group delay time.

3. The device of claim 1, wherein the low-pass filter has a finite impulse response.

4. The device of claim 1, wherein the device is an integral component of a controller of the machine tool or production machine.

5. A controller for a machine tool or production machine, comprising a device for apportioning a movement of a machine element driven by at least two drives for movement along a drive axis of the machine tool or production machine, said device including a low-pass filter that filters predetermined desired drive axis values to generate filtered desired drive axis values, a first controller receiving the filtered desired drive axis values as control input value for controlling a first of the at least two drives, a delay unit with a constant group delay time, said delay unit temporally delaying the desired drive axis values to generate delayed desired drive axis values, a subtracter that determines a difference between the filtered desired drive axis values and the delayed desired drive axis values, and a second controller receiving the determined difference and providing, based on the determined difference, a second control input value for controlling a second of the at least two drives.

6. A method for apportioning a movement of a machine element driven by at least two drives for movement along a drive axis of a machine tool or production machine, comprising the steps of:
    filtering predetermined desired values with a low-pass filter and generating filtered desired drive axis values, said low-pass filter having a constant group delay time;
    transmitting the filtered desired drive axis values to a first controller as a control input value for controlling a first of the at least two drives;
    temporally delaying the desired drive axis values with a delay time that is identical to the group delay time;
    determining a difference between the filtered desired drive axis values and the delayed desired drive axis values; and
    transmitting the determined difference to a second controller as a control input value for controlling a second of the at least two drives.

7. The method of claim 6, wherein a duration of the temporal delay of the desired drive axis values is identical to the group delay time.

* * * * *